United States Patent [19]
Goodzeit et al.

[11] Patent Number: 5,687,933
[45] Date of Patent: Nov. 18, 1997

[54] ATTITUDE CONTROL FOR SPACECRAFT WITH MOVABLE APPENDAGES SUCH AS SOLAR PANELS

[75] Inventors: Neil Evan Goodzeit, Princeton; Santosh Ratan, Lawrenceville, both of N.J.

[73] Assignee: Martin Marietta Corporation, East Windsor, N.J.

[21] Appl. No.: 543,733

[22] Filed: Oct. 16, 1995

[51] Int. Cl.[6] .............................. B64G 1/26; B64G 1/36
[52] U.S. Cl. ......................... 244/169; 244/171; 244/172; 244/173
[58] Field of Search ......................... 244/158 R, 164, 244/169, 171, 172, 173

[56] References Cited

U.S. PATENT DOCUMENTS

| | | | |
|---|---|---|---|
| 4,407,469 | 10/1983 | Fox | 244/169 |
| 4,537,375 | 8/1985 | Chan | 244/171 |
| 4,591,117 | 5/1986 | Scott | 244/170 |
| 4,684,084 | 8/1987 | Fuldner et al. | 244/173 X |
| 5,098,041 | 3/1992 | Uetrecht | 244/171 X |

FOREIGN PATENT DOCUMENTS 6-144398  5/1994  Japan .................. 244/158 R

*Primary Examiner*—William Grant
*Attorney, Agent, or Firm*—W. H. Meise; C. A. Berard; S. A. Young

[57] ABSTRACT

A spacecraft includes a three-axis attitude control system. When velocity change thrusters are fired, their plumes impinge on a solar array, at angles which vary with the solar array position. This causes disturbance torques which vary with the solar array position. Disturbance torque information signals or torque bias signals which depend upon the solar array angle are summed with the torque demand signals which control the attitude control system during firing of the velocity change thrusters, to modify the attitude correction torques. The bias torque signals are generated by a Fourier processor based upon stored Fourier coefficients together with signals from a solar array angular position sensor.

3 Claims, 5 Drawing Sheets

ATTITUDE CONTROL FOR SPACECRAFT WITH MOVABLE APPENDAGES SUCH AS SOLAR PANELS

This application claims priority of Provisional Application Ser. No. 60/003,044 filed Aug. 30, 1995.

FIELD OF THE INVENTION

This invention relates to attitude control systems for maintaining spacecraft attitude control under conditions in which thrusters are used for imparting a velocity change to the spacecraft, and thruster plume impingement on a movable appendage such as a solar panel creates unwanted torques which affect attitude.

BACKGROUND OF THE INVENTION

FIG. 1 represents a spacecraft 10 orbiting about Earth 12. Spacecraft 10 includes a body 14 defining an Earth face 16, an East face 18, and a south face 20. A pair of solar panels 22a and 22b are mounted to body 14 by means of supports 24a and 24b, respectively, which allow rotation in the direction of arrow 26 about an axis 27, so as to allow the solar panels to be rotated to face the Sun. The solar panel angular position $\theta$ is measured as the included angle 34 measured from yaw axis 28 to a plane 32 which is orthogonal to or normal to the plane 30 of the solar panels. Spacecraft body 14 includes two pairs of velocity change thrusters, which are used for stationkeeping maneuvers. A first pair 36 includes thrusters 36a and 36b, while pair 38 includes thrusters 38a and 38b. Spacecraft body 14 also bears a plurality of attitude control thrusters designated 40, some of which are illustrated as being mounted on the South face 20, which are used to aid in maintaining a particular attitude of the spacecraft, usually an attitude in which an antenna or instrument is pointed toward Earth. The thrusters of thruster pairs 36 and 38 and the attitude control thrusters 40 all operate by mass ejection, and in that respect may be interchangeably used to produce a velocity change or a torque. However, the thrusters are often optimized for the particular use to which they are put, so that they achieve maximum efficiency or efficacy, either in terms of thrust per unit of mass ejected, or in terms of the torque available in preferred directions, as might arise due to the thruster locations relative to the center of mass. Thus, the thrusters of pairs 36 and 38 desirably have their nominal thrust axes directed through the center of mass, to minimize undesired torques, while attitude control thrusters 40 have their thrust axes far from the center of mass.

FIG. 2 is a simplified block diagram of a prior-art thruster control system for the spacecraft 10 of FIG. 1. In FIG. 2, attitude sensors illustrated as 212 produce attitude-representative signals on a path 214 for application to the noninverting (+) input port of a summing circuit 216. Summing circuit 216 takes the difference between the attitude signals and commanded attitude signals applied to the inverting (−) input port of summing circuit 216 by way of a signal path 218, to produce attitude error signals on a path 220. The attitude error signals on path 220 are applied to a controller illustrated as a block 224, directly by way of path 220, and also by way of a differentiator (d/dt) illustrated as a block 222. Block 224 performs proportional-derivative (PD) compensation by multiplying the inputs by appropriate constants, and summing the products, in known fashion. PID compensation may also be used, if desired. The compensated torque demand signals are applied from controller 224 to a summing circuit 226, where it is summed with torque bias signals applied over a signal path 227, and the summed torque demand signals are applied to a thruster selection and drive logic arrangement illustrated as a block 230. Block 230 receives commanded velocity change ($\Delta V$) signals over a signal path 236, and selects the appropriate thrusters. When a simple velocity change is selected, commands are sent to the thrusters of pairs 36 or 38, or both, initiating the appropriate impulse response. When attitude control is commanded by torque command signals applied to thruster selection and drive logic block 230 over signal path 229, appropriate ones of the attitude control thrusters 40 of FIG. 1 are fired.

Those skilled in the art know that the firing of the velocity change thrusters of pairs 36 or 38 may result in undesired attitude changes. This may occur, for example, if there are differences between the moment arms of the paired velocity change thrusters. Another cause of attitude changes is thruster plume impingement on movable spacecraft structures. Referring to FIG. 1, it will be noted that velocity change thrusters 36a, 36b, 38a, and 38b are located on South face 20, and their plumes extend toward a region containing solar panel 22b. The presence of solar panel 22b in the plumes of the thrusters of pairs 36 or 38 results in torques which can adversely affect attitude. The attitude control system of the spacecraft will sense the attitude changes occurring as a result of firing of the velocity change thrusters, and command a corresponding correction from the attitude control thrusters. However, the bandwidth of the attitude control loop is limited, and may allow a transient attitude error at the start of a velocity change maneuver.

In order to mitigate the effects of attitude errors attributable to firing of velocity change thrusters, the arrangement of FIG. 2 provides an antenna 242 associated with an uplink channel from the ground station, and a receiver 244, which receives torque bias information from the system operators. The torque bias information is determined by the system operators from the current angular position of the solar panels, and the historical effect of the thrusters with the solar panel at that angle. The torque bias information is fed from receiver 244 by way of signal path 227 to summing circuit 226 at the beginning of the velocity change maneuver, and immediately begins an attitude correction which is selected to zero out the attitude change caused by the velocity change thrusters. This method of using commandable torque bias corrections imposes an increased workload and bookkeeping on the ground crew, possibly at an inconvenient time.

An alternative arrangement for generating the torque biases which reduces ground-crew effort involves the use of a memory 246. Memory 246 is preprogrammed with the torque biases, and the selected biases are accessed under control of receiver 244, for coupling to signal path 227 the torque biases appropriate to the current situation. However, this may require a relatively large memory. Assuming that the torque biases may be selected in increments of 5° of solar panel rotation, there are 360°/5=72 increments. At each increment, a torque bias value must be stored for each of pitch, roll, and yaw, which results in 72×3=216 values. Since there are two sets of velocity change thrusters, this number must be multiplied by two, for a total of 432 values or stored words. This is not an insignificant amount of memory. Improved corrections for velocity change thrust impingement are desired.

SUMMARY OF THE INVENTION

In general, a spacecraft according to the invention includes a three-axis attitude control system. When velocity change thrusters are fired, their plumes impinge on a solar array (or other movable appendage), at angles which vary with its position. This causes disturbance torques which vary with the position of the solar array. Disturbance torque information signals or torque bias signals which depend upon the solar array angle are summed with the torque demand signals which control the attitude control system during firing of the velocity change thrusters, to modify the attitude correction torques. The bias torque signals are generated by a Fourier processor based upon stored Fourier coefficients together with signals from a solar array angular position sensor.

More particularly, a spacecraft attitude control system for a spacecraft which includes (a) attitude control thrusters for applying torques to the spacecraft in response to energizing signals applied thereto, (b) a velocity change thruster, and (c) a rotatable appendage upon which the plume of the velocity change thruster impinges during firing thereof to create attitude disturbance torques, includes an attitude sensor coupled to the spacecraft for generating attitude-representative signals representing the attitude of the spacecraft. The attitude control system also includes a source of desired-attitude signals which represent the desired attitude of the spacecraft; these signals may be uplinked from the ground, or may be part of an autonomous program. An attitude error signal generator is coupled to the attitude sensor and to the source of desired-attitude signals, for taking the difference between the attitude-representative signals and the desired-attitude signals, to thereby generate attitude error signals. An error signal processor is coupled to the attitude error signal generator, for processing the attitude error signal with at least a proportional characteristic, and preferably with a PID characteristic, for generating torque demand signals representative of the torque required to control or slew the spacecraft toward the desired attitude. A thruster selection and drive processor includes an input port, and also including an output port coupled to the attitude control thrusters, for responding to summed torque demand signals applied to the input port of the thruster selection and drive processor, for selecting appropriate ones of the attitude control thrusters, and for applying energizing signals to the selected ones of the attitude control thrusters, for generating a torque represented by the torque demand signals applied to the input port of the thruster selection and drive processor. A coupling arrangement includes a first input port coupled to the error signal processor and an output port coupled to the input port of the thruster selection and drive processor. The coupling arrangement also includes a second input port coupled to the source of torque bias signals, for summing torque bias signals applied to the second input port of the coupling arrangement with the torque demand signals applied to the first input port of the coupling arrangement from the error signal processor, to produce the summed torque demand signals, and for applying the summed torque demand signals to the input port of the thruster selection and drive processor. An appendage position indicator is coupled to the appendage, for generating appendage position signals representative of the angular position of the appendage. A source of torque bias signals is coupled to the second input port of the coupling arrangement. The source of torque bias signals includes a first input port coupled to the appendage position indicator for receiving the appendage position signals, and also second input port for receiving predetermined Fourier coefficients representative of the plume impingement disturbance torques, for generating a Fourier series approximation of the plume impingement torques, and for applying signals representative of the Fourier series approximation of the plume impingement torques to the second input port of the coupling arrangement, whereby the Fourier series approximation signals applied to the coupling arrangement are the torque bias signals. In a particular embodiment of the invention, the rotatable appendage includes a solar array.

DESCRIPTION OF THE INVENTION

Figure 2:
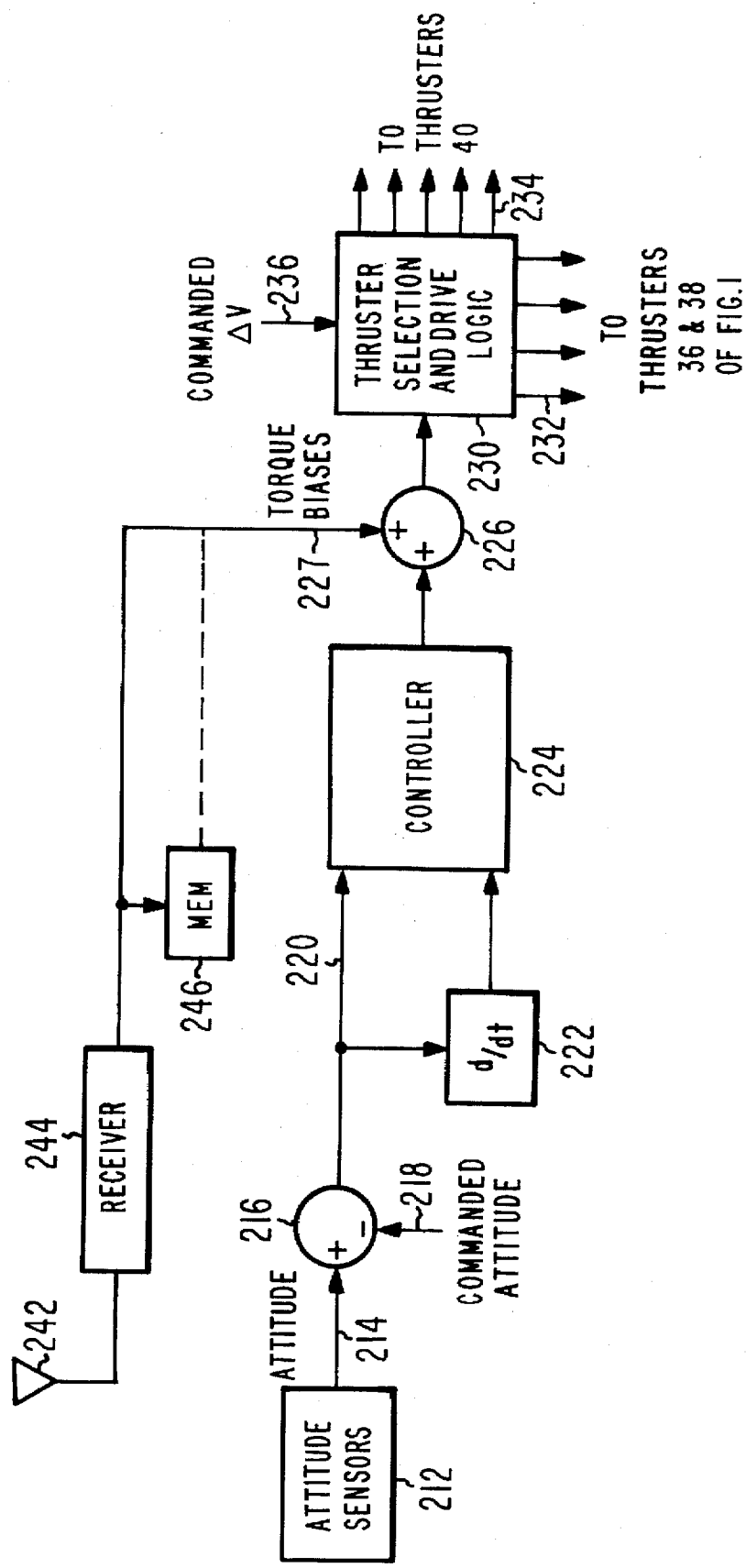
FIG. 2 is a simplified block diagram of a prior-art attitude control system which may be used in the spacecraft of FIG. 1.
Figure 3:
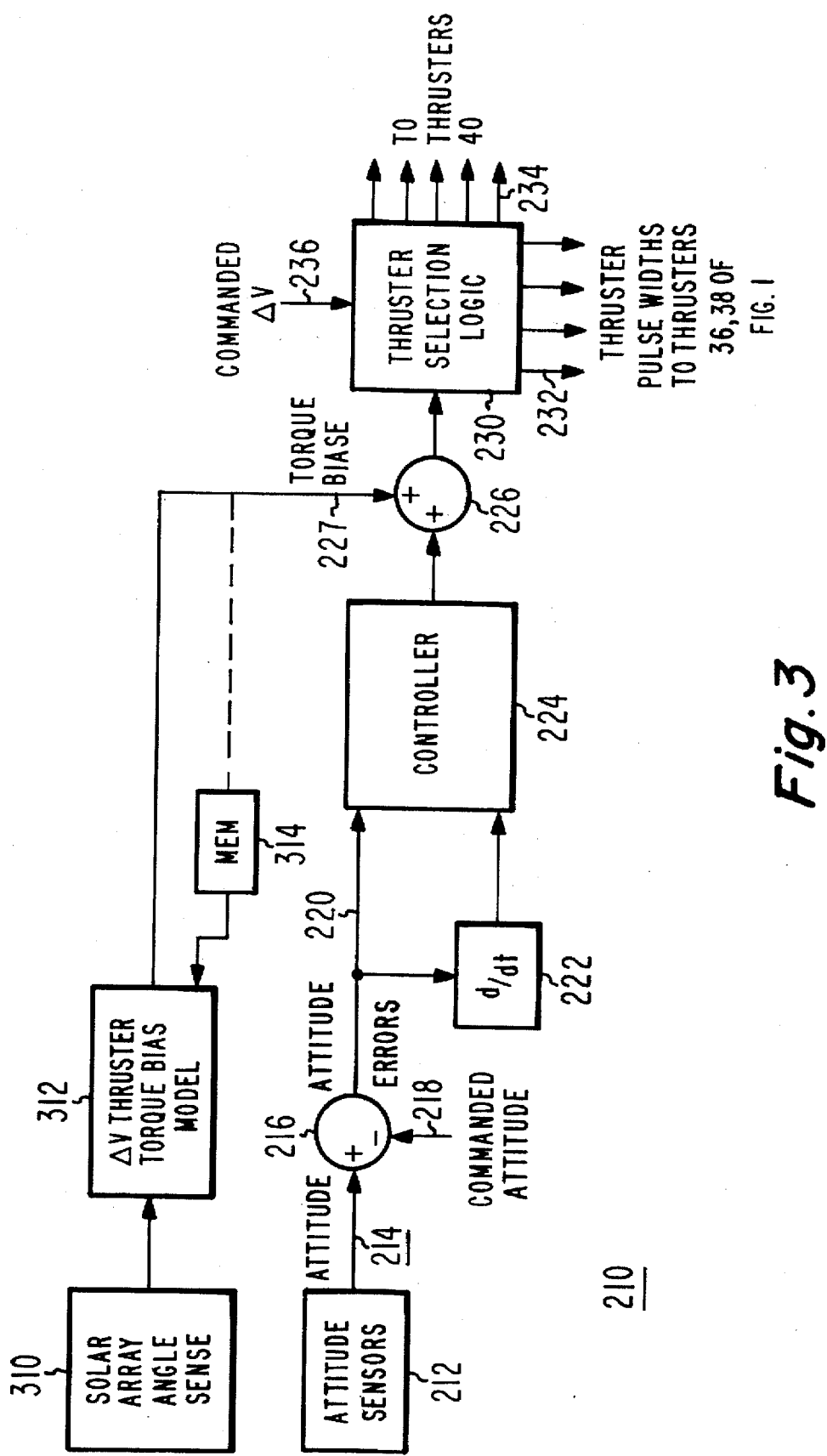
FIG. 3 is a simplified block diagram of an attitude control system according to an aspect of the invention.

In FIG. 3, a controller 210 according to the invention is similar to that of FIG. 2, except in the way the torque biases are generated and applied over signal path 227 to summing circuit 226. In FIG. 3, a solar array angle indicator 310 produces signals indicative of the solar array angle θ, which are applied to a ΔV thruster torque bias model illustrated as a block 312. The solar array angle measuring device may be a potentiometer, or a counter associated with a stepper motor. Block 312 accepts the solar array angle information, and uses a Fourier series approximation to generate the desired torque bias signals. The Fourier coefficients are stored in a memory 314, or may be implemented in hardware form. This scheme reduces the amount of information which must be stored from 432 words to as few as twenty-eight. More particularly, in one embodiment of the invention, nine coefficients or words are required for each of three axes of freedom, for a total of twenty-seven, together with a single value representing the angular difference between the two thruster sets 36, 38, for a grand total of twenty-eight coefficients.

The disturbance model associated with block 312 of FIG. 3 has the form $$T = A_0 + \sum_{i=1,N} A_i \sin(i(\theta - \theta_b) + \phi_i) \qquad (1)$$

where:

T is the torque bias;

$A_0$, $A_i$ are the Fourier coefficients, in the form i=1,N, where N is the number of harmonic terms in the approximation;

$\phi_i$ are the Fourier phases;

Θ is the solar array angle; and $\theta_b$ is the solar array angle bias.

Typically, only four harmonic terms are required to accurately model the disturbance, but of course more or fewer terms can be used, as accuracy may require.

Figure 1:
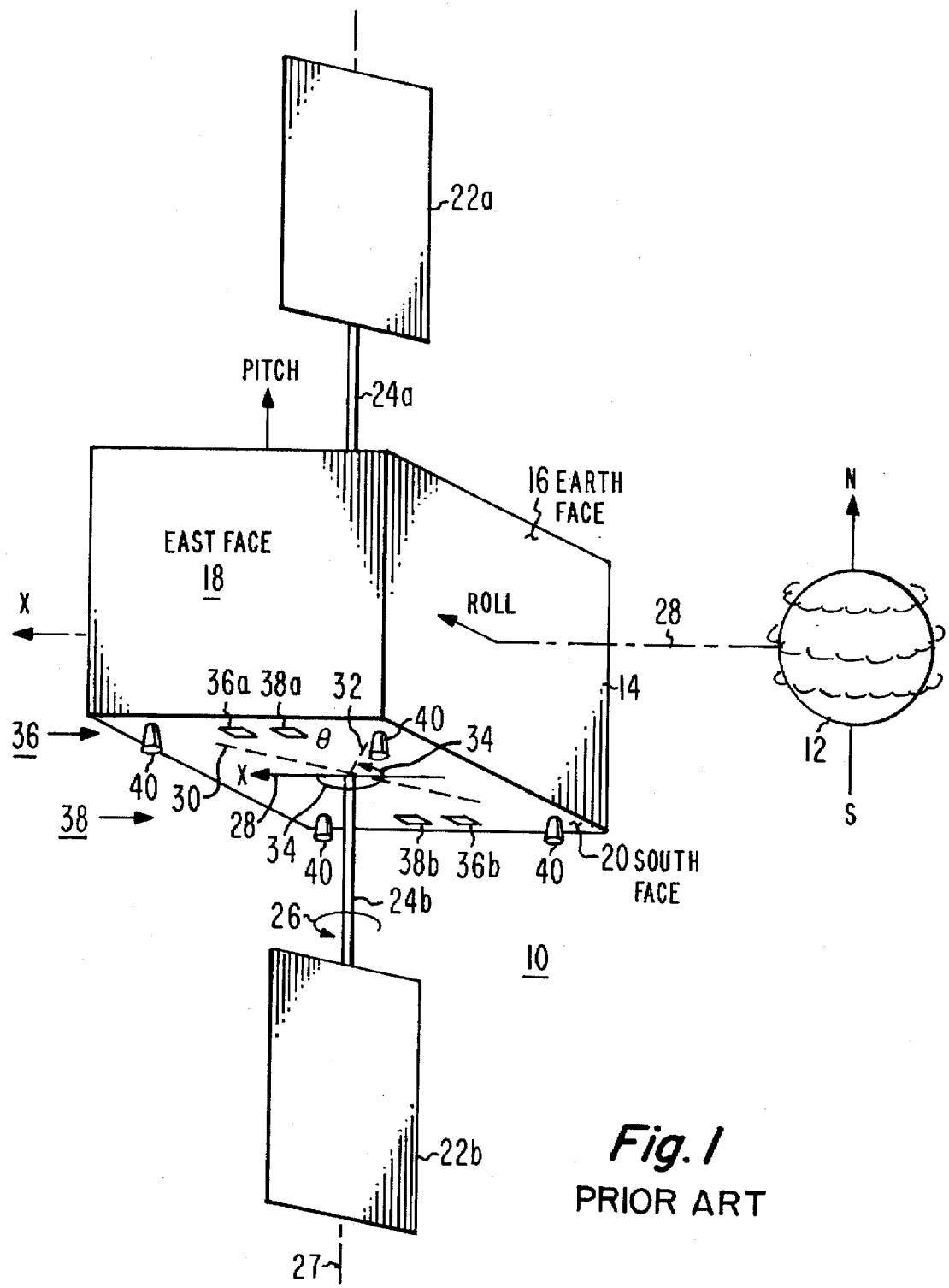
FIG. 1 is a simplified perspective or isometric view of a spacecraft orbiting a heavenly body.
Figure 4A:
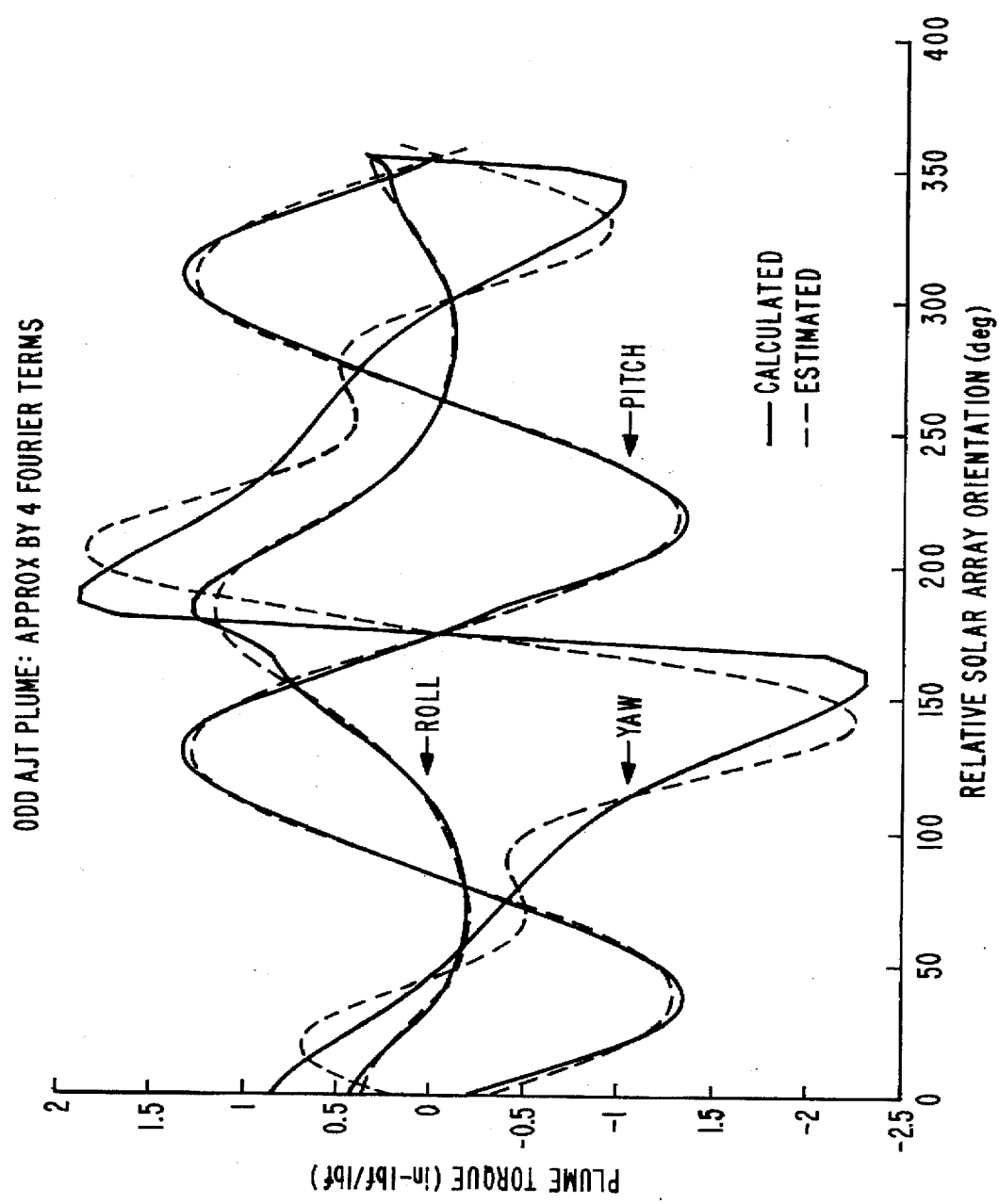
FIG. 4a illustrates plots of actual three-axis plume impingement torques for a spacecraft configured as in FIG. 1 when a first pair of velocity change thrusters are fired, together with the corresponding torques estimated by the arrangement according to the invention.
Figure 4B:
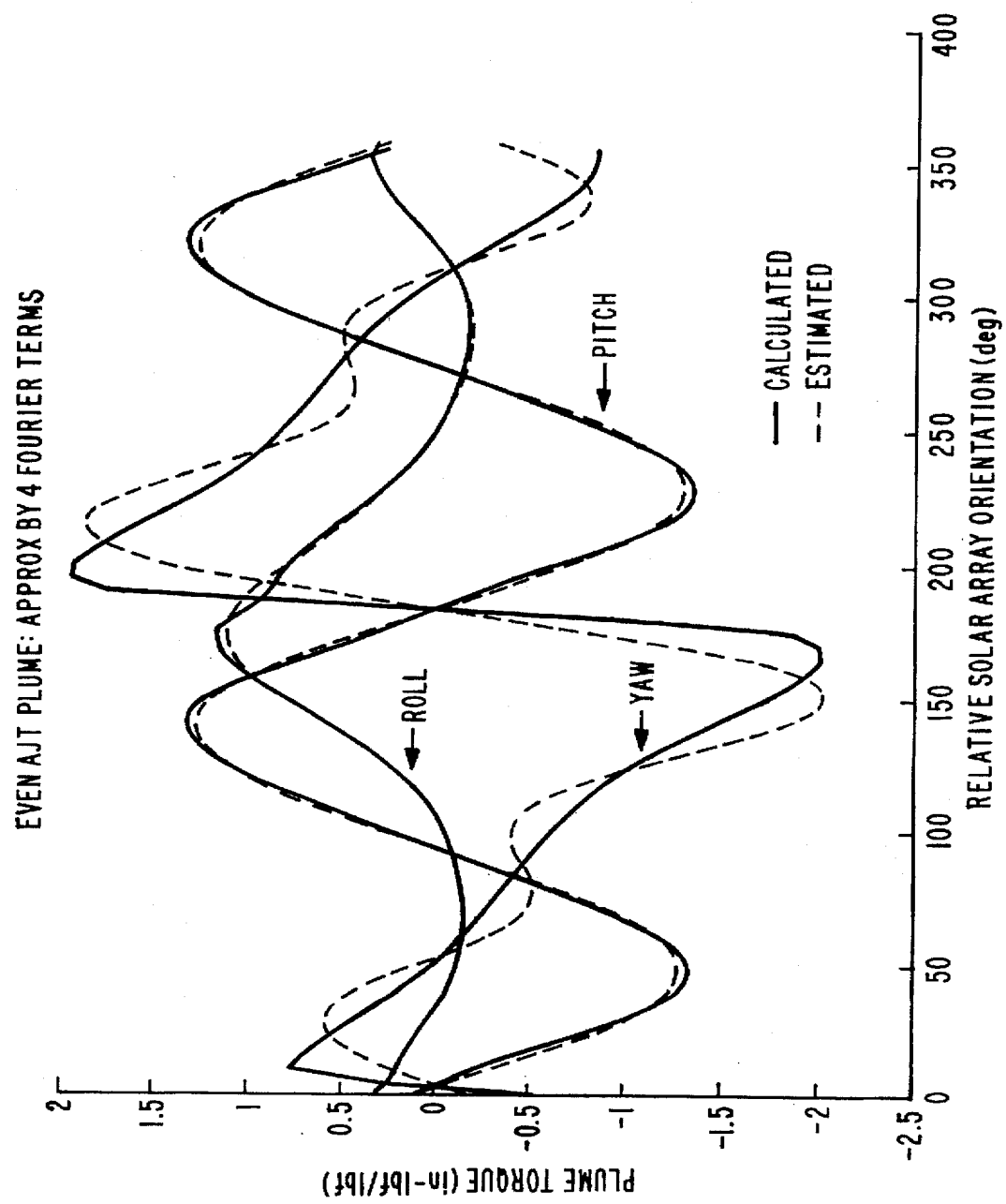
FIG. 4b illustrates corresponding plots for a second pair of velocity change thrusters.

FIG. 4 is a plot of the "actual" plume torques for the EVEN thrusters (thrusters 36a and 36b of FIG. 1) calculated from the effects of the plumes on the attitude (solid lines) and the torques estimated by the use of equation (1) (dash lines), as a function of solar array angular position from 0° to 360°, for the roll, pitch and yaw axes. There is excellent agreement between the estimated and "actual" values. Thus, the five-coefficient estimates appear to be satisfactory for each of the axes in this case.

FIG. 5 is a similar plot of the "actual" plume torques for the ODD thrusters (thrusters 38a and 38b). Comparison of FIGS. 4 and 5 reveals that the plots are similar, but displaced by about 15° in angular position. It is unnecessary to provide a further five coefficients for the ODD thrusters. It is enough to simply store the value of 15° which represents the difference between the thrusters. To estimate the plume torque for the case of the ODD thruster pair, the plume torque is calculated according to equation (1) for an angle offset by 15° from the actual solar array angle.

Other embodiments of the invention will be apparent to those skilled in the art. For example, the orientation of the solar panels may, instead of actually being measured, be inferred from knowledge of the sun's orientation within the reference frame of the spacecraft.

What is claimed is:

1. A spacecraft attitude control system for a spacecraft including attitude control thrusters for applying torques to said spacecraft in response to energizing signals applied thereto, a velocity change thruster, and a rotatable appendage upon which the plume of said velocity change thruster impinges during firing thereof to create attitude disturbance torques, said attitude control system comprising:

attitude sensing means coupled to said spacecraft for generating attitude-representative signals representing the attitude of said spacecraft;

a source of desired-attitude signals representing the desired attitude of said spacecraft;

attitude error signal generating means coupled to said attitude sensing means and to said source of desired-attitude signals, for taking the difference between said attitude-representative signals and said desired-attitude signals to thereby generate attitude error signals;

error signal processing means coupled to said attitude error signal generating means, for processing said attitude error signals with at least a proportional characteristic, for generating torque demand signals representative of the torque required to control said spacecraft toward said desired attitude;

thruster selection and drive logic means including an input port, and also including an output port coupled to said attitude control thrusters, for responding to summed torque demand signals applied to said input port of said thruster selection and drive logic means, for selecting appropriate ones of said attitude control thrusters, and for applying energizing signals to selected ones of said attitude control thrusters for generating a torque represented by said summed torque demand signals applied to said input port of said thruster selection and drive logic means;

coupling means including a first input port coupled to said error signal processing means and an output port coupled to said input port of said thruster selection and drive logic means, said coupling means comprising a second input port coupled to a source of torque bias signals, for summing torque bias signals applied to said second input port of said coupling means with said torque demand signals to produce said summed torque demand signals, and for applying said summed torque demand signals to said input port of said thruster selection and drive logic means;

appendage position indicating means coupled to said appendage, for generating appendage position signals representative of the angular position of said appendage;

said source of torque bias signals including a first input port coupled to said appendage position indicating means for receiving said appendage position signals, and a second input port for receiving predetermined Fourier coefficients representative of the attitude disturbance torques, for generating said torque bias signals as a Fourier series approximation of the attitude disturbance torques, and for applying said torque bias signals to said second input port of said coupling means.

2. A spacecraft attitude control system according to claim 1, wherein said appendage includes a solar array; and said appendage position indicating means includes a solar array position indicating means.

3. A spacecraft including an attitude control system, comprising:

attitude sensing means coupled to said spacecraft for generating attitude-representative signals representing the attitude of said spacecraft;

a source of desired-attitude signals representing the desired attitude of said spacecraft;

attitude error signal generating means coupled to said attitude sensing means and to said source of desired-attitude signals, for taking the difference between said attitude-representative signals and said desired-attitude signals to thereby generate attitude error signals;

error signal processing means coupled to said attitude error signal generating means, for processing said attitude error signals with at least a proportional characteristic, for generating torque demand signals representative of the torque required to control said spacecraft toward said desired attitude;

a plurality of attitude control thrusters, for applying torques to said spacecraft in response to energizing signals applied thereto;

thruster selection and drive logic means including an input port, and also including an output port coupled to said attitude control thrusters, for responding to summed torque demand signals applied to said input port of said thruster selection and drive logic means, for selecting the appropriate ones of said thrusters, and for applying energizing signals to said selected ones of said thrusters for generating the torque represented by said summed torque demand signals applied to said input port;

coupling means including a first input port coupled to said error signal processing means and an output port coupled to said input port of said thruster selection and drive logic means, said coupling means comprising a second input port coupled to a source of torque bias signals, for summing torque bias signals applied to said second input port with said torque demand signals to produce said summed torque demand signals, and for applying said summed torque demand signals to said input port of said thruster selection and drive logic means;

a solar array;

solar array position indicating means for generating solar array position signals representative of the angular position of said solar array;

a thruster for changing the velocity of said spacecraft, said thruster, when operated to change said velocity of said spacecraft, creating a plume which impinges upon said solar array, and thereby creates an attitude disturbance torque which tends to perturb said attitude of said spacecraft;

said source of torque bias signals including a first input port coupled to said solar array position indicating means for receiving said solar array position signals, and a second input port for receiving predetermined Fourier coefficients representative of said attitude disturbance torque, for generating a Fourier series approximation of said attitude torque, and for applying signals representative of said Fourier series approximation of said attitude disturbance torque to said second input port of said coupling means.

* * * * *